United States Patent
Maul et al.

(10) Patent No.: US 8,709,145 B2
(45) Date of Patent: Apr. 29, 2014

(54) AQUEOUS COATING COMPOSITION WITH CORROSION RESISTANT THIN-COAT ALUMINUM PIGMENTS, METHOD FOR PRODUCTION AND USE THEREOF

(75) Inventors: Robert Maul, Winkelhaid (DE); Stefan Trummer, Nürnberg (DE)

(73) Assignee: Eckart GmbH (DE)

( * ) Notice: Subject to any disclaimer, the term of this patent is extended or adjusted under 35 U.S.C. 154(b) by 1167 days.

(21) Appl. No.: 11/628,431

(22) PCT Filed: Jun. 1, 2005

(86) PCT No.: PCT/EP2005/005879
§ 371 (c)(1),
(2), (4) Date: Feb. 13, 2007

(87) PCT Pub. No.: WO2005/118722
PCT Pub. Date: Dec. 15, 2005

(65) Prior Publication Data
US 2008/0087187 A1    Apr. 17, 2008

(30) Foreign Application Priority Data

Jun. 1, 2004 (DE) .................. 10 2004 026 955

(51) Int. Cl.
*C09C 1/62* (2006.01)
(52) U.S. Cl.
USPC .......................................... 106/404
(58) Field of Classification Search
USPC ................................ 106/403, 404
See application file for complete search history.

(56) References Cited

U.S. PATENT DOCUMENTS

| | | | | |
|---|---|---|---|---|
| 2,885,366 A * | 5/1959 | Iler | | 516/90 |
| 3,945,899 A * | 3/1976 | Nikaido et al. | | 205/50 |
| 3,954,496 A | 5/1976 | Batzar | | |
| 4,321,087 A * | 3/1982 | Levine et al. | | 75/356 |
| 4,693,469 A | 9/1987 | Cedar | | |
| 4,808,231 A | 2/1989 | Kondis et al. | | |
| 5,028,639 A | 7/1991 | Treutlien et al. | | |
| 5,215,579 A * | 6/1993 | Keemer et al. | | 106/404 |
| 5,332,713 A * | 7/1994 | Oldfield et al. | | 503/227 |
| 5,332,767 A | 7/1994 | Reisser et al. | | |
| 5,424,355 A * | 6/1995 | Uemae et al. | | 524/507 |
| 5,474,605 A | 12/1995 | Schmid et al. | | |
| 5,480,481 A | 1/1996 | Setoguchi et al. | | |
| 5,505,991 A | 4/1996 | Schmid et al. | | |
| 5,624,486 A | 4/1997 | Schmid et al. | | |
| 5,931,996 A | 8/1999 | Reisser et al. | | |
| 6,287,695 B1 | 9/2001 | Kaupp et al. | | 428/403 |
| 6,409,814 B1 | 6/2002 | Bosch et al. | | |
| 7,419,538 B2 | 9/2008 | Li et al. | | |
| 2001/0009130 A1 | 7/2001 | Korn et al. | | |
| 2002/0168484 A1 | 11/2002 | Kaupp et al. | | 427/600 |
| 2003/0051634 A1 | 3/2003 | Takahashi | | |
| 2004/0030003 A1 | 2/2004 | Wegner et al. | | |
| 2004/0194663 A1 | 10/2004 | Li et al. | | |
| 2006/0000389 A1 | 1/2006 | Duguet et al. | | |
| 2007/0026224 A1 | 2/2007 | Seeger et al. | | |
| 2007/0199478 A1 | 8/2007 | Schlegl et al. | | |

FOREIGN PATENT DOCUMENTS

| | | | |
|---|---|---|---|
| CN | 1297066 A * | 5/2001 | |
| DE | 4 405 492 | 2/1994 | |
| DE | 196 35 085 A1 | 3/1998 | |
| DE | 101 00 195 | 1/2001 | |
| EP | 0 104 075 | 3/1984 | |
| EP | 0 259 592 | 7/1987 | |
| EP | 0 305 560 | 3/1989 | |
| EP | 0 451 785 | 10/1991 | |
| EP | 0 583 919 | 2/1994 | |
| EP | 0 477 433 | 4/1994 | |
| EP | 195 01 307 | 1/1995 | |
| EP | 0 678 561 | 4/1995 | |
| EP | 0 708 155 | 10/1995 | |
| EP | 1 116 756 | 1/2000 | |
| EP | 1 621 586 A1 | 1/2006 | |
| JP | 54-014358 | 2/1979 | |
| JP | 03-294360 | 12/1991 | |
| JP | 11-106686 | 4/1999 | |
| JP | 2001-259514 | 9/2001 | |
| JP | A-2002-088274 | 3/2002 | |
| JP | 2003-041150 | 2/2003 | |
| JP | 2003-041150 A | 2/2003 | |
| JP | 2003-082258 | 3/2003 | |
| JP | A-2003-082258 | 3/2003 | |
| JP | A-2003-082290 | 3/2003 | |
| JP | A-2003-089758 | 3/2003 | |

(Continued)

OTHER PUBLICATIONS

A. Kiehl, et al.: "Encapsulated aluminium pigments", *Progress in Organic Coating*, Bd. 37, 1999, pp. 179-183, XP002351232, abstract.
"PVD Aluminum Pigments: Superior Brilliance for Coatings and Graphic Arts" J. Seubert & A. Fetz, Coatings Journal, edition 8, A6 225-264, Jul. 2001, pp. 240-245.
English translation of Farbe+Lack, pp. 311-314, booklet 4 [1997] (7$^{th}$ year Apr. 1991) ["Aluminum Pigments for Aqueous Coatings—Contradiction or Reality?" Besold et al.].
English translation of Chinese Office Action dated Feb. 6, 2009 corresponding to Chinese Application No. 200580018133.0.
Japanese Office Action dated Jul. 19, 2011 in corresponding Japanese Patent Application No. 2007-513843 (with English translation).
Notice of Reasons for Rejection dated Oct. 30, 2012 in corresponding Japanese Patent Application No. 2010-513843.

*Primary Examiner* — Eli Mekhlin
(74) *Attorney, Agent, or Firm* — Ostrolenk Faber LLP

(57) ABSTRACT

The invention relates to an aqueous coating composition containing at least one water-compatible film-forming agent and aluminum pigments that are provided with at least one inorganic anti-corrosion layer, wherein the thickness of the aluminum pigments provided with at least one inorganic anti-corrosion layer averages less than 160 nm. The invention further relates to a process for the production of such a coating composition and to the use of such a coating composition and to objects coated with said coating composition.

18 Claims, No Drawings

(56) References Cited

FOREIGN PATENT DOCUMENTS

| JP | 2003-531266 | 10/2003 |
| JP | 2003-531266 A | 10/2003 |
| JP | A-2004-124069 | 4/2004 |
| JP | A-2004-131542 | 4/2004 |
| WO | WO 01/81483 | 11/2001 |
| WO | WO 2004/031304 | 4/2004 |
| WO | WO 2004/031304 A | 4/2004 |
| WO | WO 2004/087816 | 10/2004 |
| WO | WO 2004/092261 | 10/2004 |

* cited by examiner

_US 8,709,145 B2_

AQUEOUS COATING COMPOSITION WITH CORROSION RESISTANT THIN-COAT ALUMINUM PIGMENTS, METHOD FOR PRODUCTION AND USE THEREOF

CROSS-REFERENCE TO RELATED APPLICATION(S)

The present application is a 35 U.S.C. §371 National Phase conversion of PCT/EP2005/005879 filed Jun. 1, 2005, which claims priority of German Application No. 10 2004 026 955.6 filed Jun. 1, 2004. The PCT International Application was published in the German language.

TECHNICAL FIELD

The present invention relates to an aqueous coating composition which contains aluminum pigments provided with an inorganic anti-corrosion layer. The invention further relates to a process for the preparation of such a coating composition and to the use of the coating composition, and to articles coated with the coating composition.

BACKGROUND OF THE INVENTION

Aqueous coating compositions having a metallic effect have been known for many years. The metallic effect is achieved by means of lamellar metal pigments. In aqueous coating compositions, the corrosion-sensitive aluminum pigments must be provided with a protective coating in order to avoid oxidation of the aluminum pigments with the formation of hydrogen.

An important property of metallic coatings is their high luster. Luster is, inter alia, a physiologically and psychologically discerned variable, but according to DIN 67 530 the "luster capacity" of a plain surface can be determined by taking reflectometer readings. The reflection at the luster angle is measured relative to a standard (as a rule a pane of black plate glass). According to this standard, high gloss finished samples (reflectometer value >70) are measured at an angle of incidence or reflection of 20° and medium gloss finished surfaces are measured at 60°. A prerequisite for a good luster of metallic coatings is likewise optimal plane-parallel orientation of the lamellar pigments in the application medium.

The most brilliant aluminum pigments having the highest luster and flop are at present assigned to two classes: on the one hand so-called "silver dollar pigments", which are produced by wet grinding of aluminum shot, and on the other hand so-called "PVD pigments". Silver dollar pigments are distinguished from metal pigments obtained by comminution grinding by a relatively round shape and relatively smooth surface.

A coating composition which contains silver dollar aluminum pigments is described, for example, in DE 101 00 195 A1. Here, a neutralizing mixture of at least two fatty acids is present in the coating composition. After application, this coating composition is said to exhibit a markedly lower tendency to the formation of "clouds".

Aluminum pigments having a high degree of reflection and high coverage produced by wet grinding are described, for example, in EP 0 451 785 B2. The pigments are characterized by degrees of water coverage (spreading value) of from 2.5 to 5.0 m$^2$/g, a roughness value of 2.0 or less and an aspect ratio d$_{50}$/h of 90 or more. From the examples of EP 0 451 785 B2, aspect ratios up to a maximum of 140 are known. No aqueous coating compositions, however, are described in said reference.

In WO 01/81483 A1, a pigment preparation which contains aluminum pigments covered with a silicon-oxygen matrix and a binder containing carboxyl groups having an acid number of from 10 to 100 mg of KOH/g is described. The thickness characteristics of the aluminum pigments used in this case are not described. Normally, however, pigments having layer thicknesses of over 300 nm had been on the market at that time.

In the case of PVD pigments, extremely thin aluminum pigments are produced (thicknesses: 20 to 50 nm). The thickness distribution of these pigments is extremely low. In this process, aluminum is evaporated in an ultrahigh vacuum onto a carrier foil provided with a release film ("release coat"). This release film is generally a polymer. Subsequently, the evaporated aluminum is separated, as far as possible, from the carrier film in a solvent and the metal foil is comminuted mechanically or by ultrasound. The production of PVD pigments is described, for example, in J. Seubert and A. Fetz, "PVD Aluminum Pigments: Superior Brilliance for Coatings and Graphic Arts", Coatings Journal, Vol. 84, A6 225-264, July 2001, pages 240-245.

These PVD pigments have outstanding covering power on account of their extreme thinness. The thin pigments are so flexible that they really "cling" to their substrate. They should therefore be applied to a smooth substrate to display their visual possibilities.

Coating compositions containing PVD pigments in passivated form make it possible to produce coatings having a higher luster and the visually perceptible appearance of a cohesive metal film. However, on account of the expensive PVD pigments, coating compositions of this type are likewise correspondingly expensive.

Furthermore, it is drawback that the release coat can scarcely be completely removed from the pigment particles. This adhering polymer film, however, can be troublesome. This is manifested, for example, by the formation of agglomerates, which completely ruin the desired decorative effect. Agglomerates of this type lead to spot formation and increase the tendency to cloud formation.

However, polymeric adhesions of this type can have a particularly detrimental effect when the aluminum pigments are provided, after their formation, with chemical protective coatings in order to make them corrosion-resistant, such as are described in DE 196 35 085.

A further disadvantage of PVD pigments of this type is that they are difficult to handle in aqueous coating compositions. On account of their extremely high and smooth specific surface area the tendency to agglomerate is very high. In addition, coating compositions which contain these pigments are relatively difficult to apply. Automobile coatings having a uniform appearance are achieved, for example, only by means of hand coating in many thin-layer coating steps. Sensitive application behavior of this type stands in the way of automation, as is customarily employed for coating compositions containing conventional aluminum pigments.

Aqueous coating compositions which contain conventionally produced pigments—in the form of silver dollars or "cornflakes"—in passivated form, are suitable for producing metallic coatings.

The effects achievable thereby exhibit a certain metallic luster and flop. The visually perceptible appearance, however, is always such that a certain granularity of the coating can be seen. Also, on account of the thickness of these conventional pigments (>300 nm), relatively high pigmentation levels must be chosen in order to guarantee complete coverage.

In addition, many aqueous coating compositions containing aluminum pigments are prone, after application, in particular by spraying, to the formation of so-called "clouds". This is manifested by the formation of varying light and dark shades in the coating and has an extremely objectionable influence on the effect produced by the effect coating.

Cloud formation of this type is particularly objectionable if the metallic coating per se already conveys an extremely high-quality impression, i.e. is associated with high luster and flop.

The formation of clouds takes place as a result of an irregular orientation of the aluminum pigments, in particular as a result of aluminum pigments standing virtually perpendicularly in the coating.

SUMMARY OF THE INVENTION

It is therefore an object of the present invention to provide an aqueous coating composition which makes it possible to produce metallic coatings having a high luster and the appearance of a substantially structureless, cohesive liquid metal film with low pigmentation levels of metal pigments. Furthermore, it is desirable for the metallic coatings to exhibit reduced cloud formation and an improved resistance to chemicals in single-layer coatings compared with the prior art.

It is a further object of the invention to provide an aqueous coating composition which contains metal pigments which can be produced by a more cost-effective process compared with the expensive PVD preparation process. In addition, it is desirable to be able to apply the aqueous coating composition more simply than an aqueous coating composition which contains PVD pigments.

This object is achieved by the provision of an aqueous coating composition which contains at least one water-compatible film-forming agent and aluminum pigments provided with at least one inorganic anti-corrosion layer, wherein the thickness of the aluminum pigments provided with at least one inorganic anti-corrosion layer averages less than 160 nm.

Preferred refinements of the coating composition according to the invention are specified in the dependent claims.

The object on which the invention is based is furthermore achieved by a process for the production of a coating composition, which comprises the following steps:
(a) shaping of aluminum particles using a grinder in the presence of a liquid phase and lubricants and grinding elements, the grinding elements having an individual weight of 2 to 13 mg, over a period of at least 15 hours to give aluminum pigments,
(b) chemical wet-process coating of the aluminum pigments produced in step (a) with at least one inorganic anti-corrosion layer,
(c) mixing of the aluminum pigments coated in step (b) with at least one film-forming agent and a liquid phase to yield the coating composition.

Preferred refinements of the process according to the invention are as described herein.

The object on which the invention is based is furthermore achieved by the use of the coating composition according to the invention in highly lustrous coatings, such as automobile lacquers, refinishing lacquer applications, industrial lacquer applications, and application of lacquer to plastics, wood, or glass.

The object is furthermore achieved by means of an article coated with the coating composition according to the invention.

DETAILED DESCRIPTION OF CERTAIN EMBODIMENTS OF THE INVENTION

The aluminum pigments used in the invention are not PVD pigments, i.e. not aluminum pigments prepared by means of a PVD (physical vapor deposition) process, but aluminum pigments produced by mechanical shaping.

Aluminum pigments are effect pigments and are distinguished by their unique metallic appearance and their high covering power. On account of the lamellar structure of these effect pigments, they become oriented parallel to the substrate in the application medium and cause a metallic effect as a result of a combination of many individual tiny mirrors. This metallic effect is very strongly pronounced, in particular in wet lacquers. Here, in the case of full shade applications of lacquer, the effect obtained is a brightness effect dependent on the observation angle and/or angle of incidence, which is also described as "flop". Good flop is influenced by many properties of the pigments. Thus their orientation, their size and size distribution, their surface texture (roughness) and the edge texture each play an important role.

The driving force for a plane-parallel orientation of the metal pigments, which are also described as flakes, is in particular—in addition to boundary surface chemical incompatibilities of the aluminum pigments to the binder system—the aspect ratio of the pigments. The aspect ratio is understood as meaning the ratio of the length d to the thickness h of the pigments. The length is mainly determined with the aid of laser diffraction methods. Here, as a rule, the $d_{50}$ value of the cumulative breakthrough curve is used.

A disordered orientation of the aluminum pigments in the coating leads to the formation of so-called "clouds", i.e. to objectionable light-dark shadings.

Since the longitudinal extent of the aluminum pigments is strongly dependent on the respective intended use, a high aspect ratio and thus the best possible orientation can especially be achieved by way of the thickness of the pigments. Thin pigments show better orientation and therefore have higher gloss and flop. In addition, the covering power is markedly improved.

Water lacquers as environmentally friendly systems are becoming increasingly widespread on the market. The aluminum pigments therein must be provided with a passivating protective layer. Otherwise, reaction with water leads to oxidation of the pigment—accompanied by the loss of the effect properties—and to the formation of hydrogen (gassing). This is a hazard factor.

Various processes for the passivation of aluminum pigments are known. The most effective are chromation (EP 0 259 592) and an $SiO_2$ coating (U.S. Pat. No. 2,885,366, U.S. Pat. No. 3,954,496, EP 0 678 561, DE 195 01 307, EP 0 708 155).

In other processes, the aluminum pigments are treated with vanadium compounds (EP 0 104 075) or with molybdenum compounds (U.S. Pat. No. 5,480,481 and EP 0 583 919) or a combination thereof (U.S. Pat. No. 4,693,469).

Coatings comprising synthetic resins (EP 0 477 433) have been found to be less efficient. Treatment with organophosphorus compounds such as phosphonic acids or phosphoric acids (U.S. Pat. No. 4,808,231) or phosphites (U.S. Pat. No. 5,215,579) and their esters is also far less efficient. Stabilities to gassing are produced in relatively mild water-based lacquer systems by this means, but not in very aggressive systems.

When using passivated aluminum pigments of this type in aqueous coating compositions, however, not only is the stability to gassing an important factor. Following passivation, the pigment surface must be readily wettable by the binder and the solvent in the coating composition.

The stability to corrosion of the passivated aluminum pigments is initially significant only with respect to the stability to gassing in the aqueous coating composition. In many applications—such as, for example, in the largest market segment, automobile lacquering—the coated article is also provided with an additional clear lacquer layer. On account of its barrier action, this provides adequate protection against corrosion of the aluminum pigments in the base lacquer layer.

Of increasing interest, however, is an aqueous coating composition which also affords protection against corrosion for the aluminum pigments in a single-layer coating without an additional clear lacquer layer. Fields of application which may be mentioned here are consumer electronics, coatings of mobile phones and the automobile industry.

In the coating composition according to the invention, the passivating inorganic anti-corrosion layer of the aluminum pigment preferably contains oxides and/or hydroxides selected from the group consisting of silicon, zirconium, aluminum, chromium, vanadium, molybdenum, boron, and/or mixtures thereof. The inorganic anti-corrosion layer can also contain molybdenum peroxides. Preferably, the passivating anti-corrosion layer consists of the aforementioned components.

The anti-corrosion layer can also be a mixed layer of aluminum oxides and/or chromium oxides. Such an anti-corrosion layer can be obtained by treating the shaped aluminum pigments to so-called chromation with chromic acid.

The content of the anti-corrosion layer is preferably less than 20% by weight, based on the total weight of the aluminum pigments provided with the anti-corrosion layer. In order to obtain adequate passivation of the aluminum pigments, one anti-corrosion layer is sufficient. Of course, it is also possible, however, to apply to the aluminum pigments more than one anti-corrosion layer, for example two or three layers. In order, however, not to unnecessarily increase the mean thickness of the aluminum pigments, preferably only one anti-corrosion layer is applied.

A layer of silicon dioxide for protection against corrosion is preferred, which is applied to the aluminum pigments by the sol-gel process. Furthermore, the silicon dioxide surface is preferably coated with organofunctional silanes. Surface modification with organofunctional silanes imparts to the effect pigment good and controllable wetting properties to the binder.

The coating composition according to the invention thus allows for the integration or embedding of the extremely thin aluminum pigments to a layer of lacquer or paint. In addition to the anti-corrosion layer surrounding the aluminum pigments, a further protection against corrosion of the aluminum pigments is achieved by embedding them in the layer of lacquer or paint. The organofunctional groups applied to the surface of the $SiO_2$ protective layer in fact allow reaction with binder components and lead to covalent bonding of the aluminum pigments in the layer of lacquer or paint. On account of such chemical fixation in the layer of lacquer or paint, it is no longer necessary to apply a further protective layer, for example a clear layer of lacquer.

Moreover, it has been found, surprisingly, that a layer of lacquer or paint produced using the coating agent according to the invention exhibits an unusually high gloss and excellent chemical stability with or without a top layer of clear lacquer. With conventional lacquers, a clear lacquer layer must necessarily be applied to the pigment-containing base lacquer in order to obtain the desired gloss.

The amount of $SiO_2$ that is used to achieve complete covering of the aluminum pigment in order to achieve stability to gassing should be as low as possible. High amounts of $SiO_2$ decrease the covering power of the effect pigment and can have a detrimental influence on the visual properties.

The amount of $SiO_2$ on the coated aluminum pigments for the coating compositions according to the invention preferably lies in the range of from 2 to 20% by weight, preferably from 3 to 15% by weight and more preferably from 4 to 10% by weight, in each case based on the weight of the total effect pigment in dry form.

Depending on the specific surface area of the aluminum pigment, layer thicknesses of the $SiO_2$ layer of 3 to 20 nm usually give these contents of $SiO_2$.

For the achievement of high gloss coatings having the optical effect of a substantially structureless, preferably completely structureless, cohesive liquid metal film, it is indispensable to use very thin aluminum pigments. The mean layer thickness of the aluminum pigments provided with an inorganic anti-corrosion layer in the coating composition according to the invention is, on average, less than 160 nm, preferably from 50 to 160 nm, more preferably from 60 to 140 nm, even more preferably from 70 to 120 nm and most preferably from 75 to 90 nm.

Below a total layer thickness of 50 nm, the aluminum pigments are so thin that they can even lose their optical opacity, i.e. their covering power decreases to a considerable extent. Above a total layer thickness of 160 nm, the desired optical properties are no longer achieved.

It is to be noted here that the layer thickness of the protective layer must be accounted for twice when considering the total layer thickness of the pigment. For instance, with a layer thickness of $SiO_2$ of 20 nm and a total layer thickness of the coated pigment of 160 nm the layer thickness of the pure aluminum pigment is 120 nm.

The layer thickness of the aluminum pigments without an applied inorganic anti-corrosion layer preferably ranges from 30 nm to 154 nm, more preferably from 50 nm to 140 nm and even more preferably from 60 nm to 120 nm. A layer thickness of from 70 to 100 nm has proven to be very suitable.

It is presumed that the reason for the optical effect of a cohesive metal film, which produces the visual impression of a substantially structureless, preferably completely structureless, metal film, is that the effect pigments stack one above the other in the tightest manner after application. On account of their thinness, they can very easily stack one above the other without problems occurring such as gloss cloudiness (haze). Behavior of this type in very thin aluminum pigments produced by PVD processes is known. Pigments of this type cling completely to their substrate.

Surprisingly, it has been found that a similarly marked behavior is also found in the case of aluminum pigments which have been rolled out very thinly by mechanical shaping and which have been subsequently provided with an inorganic anti-corrosion layer.

This is completely unexpected, since it is known, for example, from A. Kiehl and K. Greiwe, "Encapsulated Aluminium Pigments", *Progress in Organic Coatings* 37 (1999), p. 179, that inorganic $SiO_2$ layers impart high shear resistance to aluminum pigments on account of their hardness and toughness. Thus, it would have been expected that the flexibility of the aluminum pigments would have been so impaired that "clinging" to one another should no longer have been possible with SiO$_2$-coated aluminum pigments. Surprisingly, the optical effect is also not, or not significantly, impaired by the not inconsiderable increase in the total layer thickness of the pigments due to the inorganic anti-corrosion layer within the limits indicated.

A mixed layer of aluminum oxide and chromium oxide is again preferably used as inorganic anti-corrosion layer. This mixed layer is formed by a process known as the chromation process and provides extremely effective protection against corrosion. The production of pigments of this type is described in EP 0 259 592, which is included herein by reference.

In a preferred refinement of the invention, the aluminum pigment is subjected to wet-chemical oxidation after shaping. This is described per se in EP 0 848 735, which is included herein by reference. As a result of the oxidation, an aluminum oxide/hydroxide layer is formed, which imparts passivating properties to the pigment. In addition, this treatment of the aluminum flakes causes them to be colored in the yellowish-gold color range.

The determination of the mean layer thickness of coated aluminum pigments which are components of a coating composition can be carried out by two processes. These constitute, on the one hand, the spreading value method and, on the other hand, thickness determination via scanning electron micrographs produced on cross-cuts of sprayed applications of the coating composition. In the latter process, it is possible—with suitable cross-cut preparation—to distinguish between the aluminum core and the anti-corrosion layer. In this case, the sample is prepared with attention being paid to achieving parallel orientation of the pigments to one another of optimal uniformity, in order to avoid any significant errors in the pigment thickness readings.

The spreading value method has been known for a long time for the thickness determination of aluminum pigments. DIN 55923 specifies a procedure for the measurement of the degree of water coverage (spreading) of "leafing" pigments. Its use presupposes that the aluminum pigments are largely isolated in the coating composition. To this end, the coating composition is mixed with an organic solvent, such as, for example, acetone or ethyl acetate, in a ratio of 1:1 by weight and subjected to centrifugation (1000 rpm for 5 min). The aluminum pigments settle and the supernatant is decanted. The settled aluminum pigments are redispersed in 10 times their weight of solvent, recentrifuged, and the supernatant is decanted off. This process is repeated 10 to 20 times. The aluminum pigments are then largely separated from the film-forming agent and other nonvolatile components of the coating composition. Subsequently, they are dispersed in a 10% strength stearic acid solution in white spirit and stirred for 15 min. They are then separated from the solution by filtration and dried. By means of this procedure, stearic acid is adsorbed on the pigments to impart "leafing" properties thereto.

Subsequently, a defined weight of aluminum pigments treated in this way in a readily volatile organic solvent is placed on a water surface in a trough. The pigments spread out on the water surface and form a silver metal film. By stirring with a glass rod, they are dispersed to give a uniform "cloudless" metal film. Subsequently, the film is pushed together by two rulers, until it exhibits its first wrinkles. The film is then expanded again until the wrinkles disappear. The area covered by the metal film is measured and defined as the water coverage in cm$^2$/g (or alternatively in m$^2$/g), based on the weight of the pigment.

In this method, it is assumed that the metal pigments are arranged next to one another, at least on average, and are consequently present in a single "monolayer" of pigment.

With the aid of this water coverage, the mean thickness h in nm of the pigments is calculated according to the following formula:

$$h = \frac{10^7 (\text{nm}/\text{cm})}{\rho(\text{g}/\text{cm}^3) * \text{water coverage}(\text{cm}^2/\text{g})}$$

where $\rho$ is the physical absolute density of the pigment adsorbed with stearic acid. A value of about 2.5 g/cm$^3$ is usually read in such cases.

When using scanning electron microscopy for thickness determination, an application of the coating composition is first prepared and this is allowed to become hard. Subsequently, a cross-cut is prepared, for example using a microtome. The cross-cut is carefully polished. Polishing agents used are, for example, suspensions of octanephosphonic acid or nanoscalar SiO$_2$ particles.

Subsequently, electron micrographs of the cross-cut are taken. For this purpose, in order to obtain statistically relevant figures, at least 50, preferably at least 75 and more preferably at least 100, particles should be counted. With a suitable cutting preparation, it is possible to distinguish between the layer thickness of the aluminum core and that of the anti-corrosion layer on account of the contrast. A correction of the azimuthal angle, which as a rule can be estimated with the naked eye, is to be performed. In this method, the distribution of the thickness ratios is additionally determined.

The thinness of the aluminum pigments produces a remarkably high aspect ratio. The aluminum pigments coated with an anti-corrosion layer have an aspect ratio, which is calculated from the ratio of the mean longitudinal extent to the mean thickness, of preferably more than 120, more preferably more than 160, more preferably more than 200 and even more preferably more than 220. The mean longitudinal extent here is the $d_{50}$ value of the cumulative breakthrough distribution, as is customarily determined by laser diffraction methods (Frauenhofer diffraction).

The coating compositions according to the invention are based on aqueous coating compositions. This means that water, as the solvent component, is present in an amount of preferably from 50 to 98%, more preferably from 60 to 95% and even more preferably from 70 to 90%. The rest can be composed of various organic solvents. Examples thereof are alcohols such as n-butanol, isopropanol, Dowanol PM, glycols such as butyl glycol, butyl diglycol, ethyl diglycol, and hydrocarbons such as white spirit or solvent naphtha and also heterocyclic compounds such as N-methyl-pyrrolidone.

Suitable film-forming components are all conventional, water-compatible binders. The binders can be curable physically, thermally, or thermally combined with electromagnetic radiation ("dual-cure"). Thermally curable binders can be self-crosslinking or hetero-crosslinking. Self-crosslinking binders have both types of complementary reactive groups necessary for curing. Hetero-crosslinking binders need a hardener or crosslinker.

The baking temperatures are preferably from 60 to 190° C.

Binders which can be used are, for example, those based on polyurethanes, polyamides, polyureas, melamine resins, polyimides, polyacrylates, polymethacrylates, epoxy resins, polyethers, or polyesters. Also possible is the use of combinations of these functionalities such as, for example, polyester-polyurethanes or polyester-polyether-polyurethanes, polyester-polyacrylates or polyacrylate-polyurethanes.

Preferably, binders are used which contain carboxyl groups and preferably have an acid number of from 10 to 100 mg of KOH/g of binder and more preferably from 40 to 80 mg of KOH/g of binder. It is also preferred for these binders to have molecular weights of from 500 to 5000 g/mol.

The ratio of the proportions by weight of aluminum pigment to film-forming agent is from 1:1 to 1:10, preferably from 1:3 to 1:6 and more preferably from 1:4 to 1:5.

When the ratio of the proportions by weight of aluminum pigment to film-forming agent of greater than 1:1, the coating composition is overpigmented, i.e. the optical effect markedly decreases. In particular, the formation of the desired high gloss and the appearance of a structureless "cohesive liquid metal film" no longer occur. Below a ratio of the proportions by weight of 1:10, the concentration of aluminum pigment present in the coating composition is too low to guarantee adequate coverage and a metallic effect.

The above details relate, however, in particular to full-tone coating compositions. If the coating composition also contains other effect pigments such as, for example, pearl luster pigments, the proportion of aluminum pigments can be further reduced, if desired.

The total amount of the aluminum pigments provided with an anti-corrosion layer and having a mean thickness of less than 160 nm, based on the total weight of the coating composition according to the invention (pigmentation level), is preferably less than 10% by weight. Preferably, less than 5% by weight and more preferably less than 3% by weight are employed. On account of the small thickness of the pigments, their covering power is excellent, so that extremely low pigmentation levels are adequate for achieving the desired visual impression.

The coating composition can contain further effect pigments. These comprise, for example, pearl luster pigments, aluminum pigments coated with colored oxides such as Paliocrom® (supplied by BASF, Germany), interference pigments or admixtures with other, thicker aluminum pigments (Hydrolan®, Hydrolux®, supplied by Eckart, Germany).

The ratio of the amounts of thin aluminum pigments to such further effect pigment or binder employed in this case cannot generally be given and depends on the nature of the effect pigment employed. Thus, pearl luster pigments have a much lower covering power than aluminum pigments. The following compositions (based on the total weight of coating composition), for example, can be used here:

| | |
|---|---|
| thin Al pigment with passivating anti-corrosion layer: | 0.5-2.0% by weight |
| pearl luster pigment: | 5-15% by weight |
| film-forming agent: | 5-15% by weight. |

If, instead of pearl luster pigment, conventional, thicker aluminum pigments or aluminum pigments coated with colored oxides such as Paliocrom® are used, then, for example, the following composition can be used:

| | |
|---|---|
| thin Al pigment with passivating anti-corrosion layer: | 0.5-2.0% by weight |
| conventional or colored Al pigment: | 1.5-3.0% by weight |
| film-forming agent: | 5-15% by weight. |

Furthermore, the coating composition according to the invention can contain colorants such as organic and/or inorganic colored pigments and/or dyes.

In addition, the coating composition according to the invention can contain additives such as fillers, reactive diluents, pH regulators such as, for example, organic amines, UV absorbers, light-stabilizing agents, free radical scavengers, photoinitiators or coinitiators, crosslinking agents, de-aerating agents, slip additives, inhibitors, defoaming agents, emulsifiers, wetting and dispersing agents, adhesion promoters, leveling agents, film-forming aids, thickeners, flame-proofing agents, siccatives, drying agents, antiskinning agents, corrosion inhibitors, anti-corrosion pigments and/or waxes. Combinations of these additives are possible and preferred.

In a refinement according to the invention, the aluminum pigments provided with an inorganic anti-corrosion layer are also additionally treated with corrosion-inhibiting organic additives. Examples of these are organic phosphonic acids and/or their esters, organic phosphoric acids and/or their esters and/or long-chain organic amines having more than 12 C atoms. This addition of further corrosion-inhibiting additives can also additionally increase the gassing stability of the aluminum pigments.

In a further refinement according to the invention, the aluminum pigments are at first not provided with an inorganic anti-corrosion layer, but rather formulated together with inorganic anti-corrosion pigments in the aqueous coating composition. A stabilizing method of this type is described in EP 1 116 756, which is included herein by reference. The anti-corrosion pigments show very low water solubility. In the aqueous coating composition, a thin film of the material of the anti-corrosion pigment is therefore formed after some time on the surface of the aluminum pigments, which ultimately provides protection against corrosion.

Suitable anti-corrosion pigments are various inorganic pigments. These include, for example, strontium zinc phosphosilicate, zinc aluminum polyphosphate hydrate, zinc calcium aluminum strontium phosphosilicate hydrate, zinc calcium strontium orthophosphosilicate, strontium aluminum polyphosphate hydrate, calcium aluminum polyphosphosilicate hydrate, and sodium and/or calcium and/or zinc molybdate or phosphomolybdate, zinc phosphate complex, or mixtures thereof.

The total solids content, i.e. the nonvolatile content as specified by DIN 53216, of the coating compositions according to the invention is from 8 to 40%. Preferably, the total solids content is from 9 to 30% by weight and more preferably from 10 to 25% by weight.

When the solids content falls below 8%, the mechanical durability of the coating following application and hardening (drying) of the coating composition is no longer afforded. The lacquer contains insufficient binder.

Contents above 40% are known per se from of the range of conventional coating compositions—so-called "high-solids" compositions—, but they cannot be used in the present case for aqueous systems containing thin aluminum pigments of this type. In such a case the rheology of the coating compositions would be too poor.

After their application to a suitable substrate, the coating compositions according to the invention produce a structureless metallic coating of a high gloss finish. The effect obtained is like the appearance known under the phenomenon of the "chrome effect".

Shaping of the aluminum particles carried out in the process according to the invention is an extremely gentle shaping treatment.

According to a preferred refinement of the invention, the grinding elements each have a weight of from 5.0 mg to 12.0 mg. The grinding elements used are preferably spherical solids, more preferably balls.

After the aluminum particles have been shaped, the aluminum pigments obtained are separated from the grinding elements, preferably the grinding balls. In a further process step, the aluminum pigments obtained can be subjected to size classification. Subsequently, the aluminum pigments can be either converted into the form of a paste having a specific solids content or else left as a filter cake.

Shaping can take place in a solvent at a weight ratio of solvent to aluminum particles of from 2.8 to 10 and at a weight ratio of the grinding balls to aluminum particles of from 20 to 70, and using lubricants as grinding aids.

The critical speed of rotation $n_{crit}$ is an important parameter which indicates when the balls begin to press against the mill wall due to centrifugal forces, at which point virtually no more grinding takes place:

$$n_{crit} = \sqrt{\frac{g}{2\pi^2} \cdot \frac{1}{D}}$$

where D is the diameter of the drum and g is the gravitational constant.

The speeds of rotation of the ball mill are preferably from 25% to 68% and more preferably from 50% to 62% of the critical number of revolutions $n_{crit}$.

Low speeds of rotation favor slow shaping of the aluminum particles. In order to cause slow shaping, light grinding balls are preferably used in the process of the invention. Grinding balls individually weighing more than 13 mg shape the aluminum particles too vigorously, which leads to premature breakage thereof. The aluminum particles used preferably consist of aluminum shot.

The conditions referred to above lead to very gentle grinding, in which the aluminum particles are slowly shaped and breakages which could result from ball impacts involving high kinetic energy are avoided. On account of the extremely gentle manner of grinding, this type of grinding takes a comparatively long time. The grinding time is from 15 to 72 h, preferably from 16 to 50 h.

The long grinding times involve a large number of pigment/ball impacts. As a result, the pigment is very uniformly shaped, which is manifested by a very smooth surface and a narrow distribution of thicknesses.

Unlike conventional grinding processes, the aluminum particles in the process of the invention are for the major part not ground or comminuted, but shaped extremely gently over a relatively long period. In this regard, the present description speaks of shaping and not of grinding the aluminum particles, although grinding elements are used for the shaping procedure.

The aluminum particles used are preferably aluminum shot. This aluminum shot is preferably produced in atomizers by atomization of liquid aluminum. Foil powder from an aluminum foil and waste foils can also be used. The shot can have a round or irregular shape. Aluminum particles in needle form are not used as starting material in the process according to the invention, since these are not transformable to thin effect pigments. It is preferred that the aluminum particles have a spherical to ellipsoidal shape. According to a preferred refinement, the aluminum shot used is preshaped.

The aluminum shot should preferably have a mean diameter of less than 100 μm and preferably less than 30 μm, more preferably less than 20 μm and even more preferably less than 10 μm. The purity of the aluminum used is preferably from 99.0 to more than 99.5%.

A large number of compounds can be used as lubricants. The fatty acids already used for a long time having alkyl radicals containing from 10 to 24 C atoms may be mentioned here. Preferably, oleic acid or mixtures of oleic acid with stearic acid are used.

The lubricant should not be employed in too small an amount, since otherwise, as a result of the intense shaping of the aluminum particles, the very large surface areas of the lamellar aluminum pigments produced are only inadequately covered by adsorbed lubricant. In this case, cold welding can occur. Typical amounts are therefore from 1 to 20% by weight and preferably from 2 to 15% by weight, of lubricating agent based on the weight of aluminum employed.

The choice of solvent is not critical as such. It is possible to employ customary solvents such as white spirit, solvent naphtha, etc. The use of alcohols, such as, for example, isopropanol, ethers, ketones, esters, etc. is possible.

The balls preferably used each weigh preferably from 2 mg to 13 mg. More preferably, the balls preferably used have an individual weight of from 5.0 to 12.0 mg. Balls having a smooth surface, as round a shape as possible, and a uniform size are preferred. The ball material can be steel, glass or ceramics, such as, for example, zirconium oxide or corundum.

The temperatures used during the shaping process are in the range of from 10° C. to 70° C. Temperatures ranging from 25° C. to 45° C. are preferred.

Due to the fabrication process of the invention, the aluminum pigments produced in this way are free from adherent polymer films, which is a great advantage. The aluminum pigments of the invention therefore do not suffer from the disadvantages of aluminum pigments still encumbered with residues of the release coats, such as are produced in PVD processes. Moreover, their manner of production is cheaper than the expensive PVD production processes. The separation of the resulting aluminum pigments from the grinding elements, preferably grinding balls, can be carried out in conventional manner by screening.

Following separation of the grinding balls, the aluminum pigments are preferably subjected to a size classification. This classification should be carried out gently, in order not to destroy the thin aluminum pigments. It may involve, for example, wet screening, decantation, or alternatively separation by sedimentation. In wet screening, the coarse fraction is usually screened off. In the other processes, the fines, in particular, can be separated. Subsequently, the suspension is freed from excess solvent (for example with the aid of a filter press).

In the subsequent passivation step, the pigments are employed in the form of a filter cake or alternatively as a paste having a specifically adjusted solids content.

When $SiO_2$ is used as protective layer, this is preferably applied by the sol-gel process.

The dispersion of the aluminum pigments in the water lacquer is preferably carried out from an aluminum pigment paste. This paste has a solvent which has preferably also been used for shaping the pigments. Preferably, the solvent here is white spirit and/or solvent naphtha, butyl glycol or isopropanol.

The solids content of the aluminum pigment paste is preferably from 20 to 65% by weight, more preferably from 25 to 60% by weight, even more preferably from 30 to 55% by weight and most preferably from 40 to 50% by weight, in each case based on the total weight of the aluminum paste.

At a solids content above 65% by weight, the pigments can agglomerate, which would have a crucial adverse effect on the optical effect. In addition, the higher specific surface area of the thin pigments would have a higher solvent requirement in order to be completely wetted. Below 20%, the paste would become too thin and it could no longer be accurately metered without additional stirring steps in order to add it to the coating composition.

The latter point in particular is a great problem in the use of PVD pigments in coating compositions. These are supplied—even in a passivated form—in dispersions having solids contents of from 10 to 20% by weight (e.g. Hydroshine® 3001, supplied by Eckart). This means that these PVD pigments—unlike the coating composition according to the invention—cannot be stored, transported, and used in an advantageous pasty form having a lower solvent content.

In a preferred embodiment, the aluminum pigment paste is made into a paste with solvent and, if appropriate, some film-forming agent, with the formation of a pigment concentrate for incorporation into the coating composition. The solvents used are preferably organic solvents such as, for example, isopropanol or butyl glycol. If appropriate, further wetting agents can also be added for better dispersion of the aluminum pigments. The film-forming agent can be present in an unneutralized, partly neutralized, or alternatively fully neutralized form. Preferably, it is present in an unneutralized form and has an acid number of from 10 to 100 mg of KOH/g of binder.

As a result of this process step, the aluminum pigments are well predispersed and optionally already wetted by the binder. The weight ratio of aluminum to solvent in this pigment concentrate is from 1:5 to 5:1, preferably from 1:2 to 2:1 and more preferably approximately 1:1. Subsequently, this pigment concentrate is mixed with the liquid phase and the film-forming agent and the other constituents of the coating composition with stirring.

The coating compositions according to the invention are used in high gloss finish coatings such as automobile lacquers (OEM and refinishing lacquer), industrial lacquers or the application of lacquer to plastics. In particular, they are used in single-layer lacquers without a clear lacquer layer. The lacquers prepared using the coating composition according to the invention can, surprisingly, also be used without any additional clear lacquer layer. The gloss of coatings of this type is even comparable to the gloss of conventional lacquers provided with a clear lacquer topcoat and conventional aluminum pigments in the base lacquer. This means, in particular in the automobile sector, that great savings can be achieved, as a separate clear layer of lacquer is not necessary.

As regards substrates suitable for application thereto, metallic substrates, plastics, wood, or glass may be mentioned as examples.

Articles coated with coating compositions according to the invention include, for example, vehicles such as automobiles, motor vehicle bodies, automobile parts made of metal or plastics material, electrical equipment such as mobile telephones, or furniture.

The invention in particular relates to the aforementioned articles, when coated with the coating composition according to the invention, without subsequent application of a further protective layer, such as, for example, a clear lacquer layer.

EXAMPLES

The following examples are provided only for the purpose of illustrating the invention and they are not, therefore, to be taken as limiting the invention in any manner.

Example 1 a) Shaping 3.1 kg of glass balls (diameter: 2 mm), 310 g of white spirit, 93 g of aluminum shot (mean diameter <8 μm) and 9.3 g of oleic acid are placed in a barrel mill (length: 32 cm, breadth: 19 cm). Subsequently, the aluminum shot is shaped at 57 rpm for 20 h. The product is separated from the grinding balls by rinsing with white spirit and subsequently screened by wet screening through a 25 μm screen. The fine grit is largely freed from the white spirit by means of a suction filter and the filter cake is then homogenized (about 40% solids).

b) $SiO_2$ Coating 96.4 g of the filter cake of the aluminum pigments shaped according to a) (equivalent to 38.5 g of Al) are dispersed in 375 ml of isopropanol and brought to the boil. 9.4 g of tetraethoxysilane are added. Subsequently, a solution of 4.0 g of 25% strength $NH_3$ in 7.0 g of water is metered in over a period of 3 h. After a further 3 h, 1 g of Dynasylan AMMO, supplied by Degussa AG, Rheinfelden, Germany, is added. The mixture is cooled to room temperature and the suspension is suction filtered through a Buchner funnel. Subsequently, the filter cake is homogenized and adjusted with isopropanol to give a paste having a solids content of 40% by weight.

c) Coating Composition

The pigment prepared under a) and b) was investigated in three different water-based lacquer systems.

The procedure is in general as follows:

The aluminum pigment paste is predispersed together with solvent (e.g. butyl glycol) using a dissolver or paddle stirrer.

The weight ratio of aluminum paste to solvent is usually 1:1. Additional wetting agents can accelerate the dispersion process.

Subsequently, the aluminum suspension is added to the binder with stirring. This mixture is stirred until homogenization is complete.

The rheological properties of the coating composition are adjusted to the respective requirements using suitable thickeners. The adjustment of the spray viscosity is carried out in the cases described using distilled water.

The lacquer solids are between 10% and 50%.

The lacquer viscosity according to DIN 53211 is from 15 s to 60 s.

The weight ratio of aluminum pigment to binder is between 0.15:1 and 0.2:1.

Lacquer system 1 is a water-dilutable metallic effect base lacquer. The film-forming agent consists of:
  5.0-10.0% by weight of polyester resin
  8.0-15.0% by weight of acrylate resin
  8.0-15.0% by weight of polyurethane resin and 0.5-3.0% by weight of melamine resin The percentages given by weight are based on the weight of the entire lacquer. All binder components are miscible with water.

Lacquer system 2 is a low-solids metallic effect water-based lacquer, the film-forming agent consisting of:
  10.0-40.0% by weight of acrylate resin, water-dilutable
  3.0-12.0% by weight of polyester resin, water-dilutable.

This lacquer has been specially conceived for the use of PVD aluminum pigments. It is employed commercially in particular for OEM lacquering and refinishing lacquering. By mixing the individual binders, a metallic effect formation of optimal brilliance is achieved.

In order to achieve suitable resistance values, these base lacquers must normally be provided with a top coating of clear lacquer.

Lacquer system 3 is a single-layer synthetic lacquer for consumer electronic goods based on:
20.0-60.0% by weight of high molecular weight acrylate dispersion and
10.0-30.0% by weight of polyurethane dispersion The mixing ratios of the binders vary, depending on the specific application.

In addition to the optical impression, the resistance characteristics, for example relative to chemicals, creams, coffee, alcohol, etc. play an important part in these lacquer systems.

The aluminum pigment prepared under 1 a) and 1 b) was compared with a commercially available silver dollar pigment (2156) supplied by Eckart, of a comparable grain range and having a PVD pigment (Metalure®, which is marketed by Eckart).

The standard silver dollar pigment was stabilized against corrosion according to EP 0 259 592 by means of chromation (product: Hydrolux 2156, Eckart) and also using a sol-gel SiO$_2$ coating (product: Hydrolan 2156, 55900/G, Eckart). The PVD pigment was stabilized against corrosion by a sol-gel SiO$_2$ coating (Hydroshine® WS 3001, Eckart).

Specific examples are listed in Table 1 below:

TABLE 1

Examples and comparative examples

| Example | Pigment | Lacquer system | Fully covering pigmentation level* in % by weight |
|---|---|---|---|
| Example 1 | Prepared as in Example 1 a) and b) | lacquer system 1 | 2.0% |
| Comparative Example 2 | Hydrolan 2156 55900/G | lacquer system 1 | 3.5% |
| Comparative Example 3 | Hydrolux 2156 | lacquer system 1 | 3.5% |
| Comparative Example 4 | Hydroshine WS 3001 | lacquer system 1 | 1.5% |
| Example 5 | Prepared as in Example 1 a) and b) | lacquer system 2 | 2.0% |
| Comparative Example 6 | Hydrolan 2156 55900/G | lacquer system 2 | 3.5% |
| Comparative Example 7 | Hydrolux 2156 | lacquer system 2 | 3.5% |
| Comparative Example 8 | Hydroshine WS 3001 | lacquer system 2 | 1.5% |
| Example 9 | Prepared as in Example 1 a) and b) | lacquer system 3 | 2.0% |
| Comparative Example 10 | Hydrolan 2156 55900/G | lacquer system 3 | 3.5% |
| Comparative Example 11 | Hydrolux 2156 | lacquer system 3 | 3.5% |
| Comparative Example 12 | Hydroshine WS 3001 | lacquer system 3 | 1.5% |

*the fully covering pigmentation level was determined beforehand by means of comparative doctor blade strokes.

Comparison was made of the optical properties, such as gloss, brightness, brilliance and flop, the lacquer applicability with respect to cloud formation (=light-dark shadings) and the chemical resistance in single-layer coatings.

Procedure:

The coating compositions were applied to test sheet metal pneumatically by means of a Langguth automatic sprayer. A SATA LP 90 was in each case used as the spraygun.

The spray parameters for this were specifically:

Lacquer System 1

| needle: | 1.0.0 |
|---|---|
| pressure: | 4 bar |
| passes: | 4 |
| flashtime between passes: | none |

After the 4th pass, the sheet metal was flashed off for 15 min, the lacquer was baked at 80° C. for 30 min and a commercially available clear lacquer was applied.

Lacquer System 2

| needle: | 0.2.0 |
|---|---|
| pressure: | 4 bar |
| passes: | 3 |
| flashtime between passes: | one minute after each pass |

After the 4th pass, the sheet metal was flashed off for 15 min, the lacquer was baked at 160° C. for 15 min and a commercially available clear lacquer was applied Lacquer System 3:

| needle: | 1.3.0 |
|---|---|
| pressure: | 4 bar |
| passes: | 3 |
| flashtime between passes: | none |

After the 4th pass, the sheet metal was flashed off for 15 min, the lacquer was baked at 80° C. for 30 min and a commercially available clear lacquer was applied.

It is to be noted here that in Comparative Examples 4, 8 and 12 it was necessary after each spray pass to blow the sheet metal dry with the aid of the cleaned spraygun. On account of their thinness and smooth surface, the PVD pigments cling to one another such that the evaporation of the solvents (mainly water) and thus the drying process is extremely retarded. A procedure of this kind is still practicable on a laboratory scale and produces very good spraying results. However, the use of such a process in automobile mass production application of lacquer, in which the vehicle bodies are lacquered by automated means, is not conceivable. This fact makes the commercial use of coated PVD pigments in water lacquers, for example, impossible at present in the automobile industry.

The brightness measurements were carried out at five different observation angles (15°; 25°; 45°; 75° and 110°) using an apparatus supplied by X-Rite at a fixed angle of incidence of 45°.

The degree of gloss was determined at 200 using a Trigloss gloss measuring instrument (supplied by Byk. Gardner).

Using a formula originally proposed by DuPont, a flop index can be determined from the brightness values at 15°, 45°, and 110° which reproduces well the angle-dependent brightness change of conventional metallic coatings (A. B. J. Rodriguez, *JOCCA*, (1992(4)) pp. 150-153):

$$\text{flop index} = 2.69 \times \frac{(L^*_{15°} - L^*_{110°})^{1.11}}{(L^*_{45°})^{0.86}}$$

TABLE 2

Brightness, flop and gloss values of coatings

| Sample | L* 110° | L* 75° | L* 45° | L* 25° | L* 15° | FLOP | Gloss 20° | Visual structural impression |
|---|---|---|---|---|---|---|---|---|
| Example 5 | 21.6 | 23.0 | 42.7 | 104.2 | 166.8 | 26.8 | 21.3 | structureless |
| Comparative Example 6 | 27.1 | 27.2 | 47.7 | 107.4 | 163.4 | 22.7 | 11.4 | particle structure discernible |
| Comparative Example 7 | 28.9 | 29.6 | 51.9 | 112.7 | 162.7 | 10.9 | 19.7 | particle structure discernible |
| Comparative Example 8 | 18.6 | 21.3 | 37.9 | 88.0 | 146.7 | 25.8 | 70.8 | structureless |
| Example 1 | 24.7 | 28.7 | 57.4 | 117.9 | 155.4 | 18.5 | 104.5 | structureless |
| Comparative Example 2 | 30.9 | 34.9 | 62.1 | 113.7 | 142.3 | 14.4 | 101.1 | particle structure discernible |
| Comparative Example 3 | 30.7 | 34.6 | 60.7 | 112.7 | 142.2 | 14.7 | 101.9 | particle structure discernible |
| Comparative Example 4 | 25.7 | 31.5 | 56.9 | 110.5 | 145.9 | 16.9 | 102.7 | structureless |

In all tests, Examples 1 and 5 according to the invention have higher flop values and higher brightness values (15°) than the corresponding comparative examples. The gloss is also highest in lacquer system 2. However, Comparison Example 8, which contains passivated PVD pigments, has the highest gloss in lacquer system 1. This, however, is not surprising, since this lacquer system was specially optimized for the use of PVD pigments. It is recommended by Eckart for the use of Hydroshine®. The examples according to the invention, as also those comparative examples in which PVD pigments were employed, exhibit no discernible structures to the naked eye. The optical impression is like that of a "liquid" metal. All other comparative examples, however, exhibit clear structuring. Although the human eye may not be able to distinguish the individual pigment particles in the lacquer, particulate structures, however, are seen.

It may be stressed that effects of this type cannot be described by conventional variables of colorimetry such as, for example, DIO (distinctness of image) or haze ("grey fog"). This is not surprising, since lacquers containing thin aluminum pigments of this type are novel and exhibit optically novel effects, which are not detectable using conventional measuring procedures.

Cloud Formation

Cloud formation is understood as meaning the light-dark shadings in effect lacquers. This is particularly significant at small lacquer layer thicknesses.

The applicability was determined by lacquering a wedge by means of pneumatic application on a LabPainter supplied by LacTec:

In each case, coating compositions based on lacquer system 1 were used. Lacquer was applied to test panels measuring 70 cm×30 cm. The speed of the conveyor was set to 0.8 m/s. The lacquer delivery of the gun was 200 ml/min and the horn air was set at 400 NL/min and the atomizer air at 6000 NL/min.

The film thickness of the dry lacquer film (wedge) was 5-24 µm.

The cloud formation is visually evaluated as a function of the layer thicknesses. The evaluation scale is from 1 to 5, where:
1=no cloud formation
2=slight cloud formation (still acceptable)
3=medium cloud formation (no longer acceptable)
4=intense cloud formation
5=very intense cloud formation

TABLE 3

Cloud formation with various layer thicknesses of the lacquer

| LAYER THICKNESS 8-10 µm | SCORE | Substrate fully covered from: |
|---|---|---|
| Example 1 | 2-3 | 10 µm |
| Comparative Example 4 | 3-4 | 10 µm |
| Comparative Example 2 | 4-5 | 15 µm |
| Comparative Example 3 | 3-4 | 12 µm |
| LAYER THICKNESS 10-12 µm | SCORE | |
| Example 1 | 2 | |
| | (full coverage from here) | |
| Comparative Example 4 | 2-3 | |
| | (full coverage from here) | |
| Comparative Example 2 | 3-4 | |
| Comparative Example 3 | 2-3 | |
| LAYER THICKNESS 12-14 µm | SCORE | |
| Example 1 | 2 | |
| Comparative Example 4 | 2-3 | |
| Comparative Example 2 | 2-3 | |
| Comparative Example 3 | 2 | |
| | (full coverage from here) | |
| LAYER THICKNESS 14-16 µm | SCORE | |
| Example 1 | 1-2 | |
| Comparative Example 4 | 2 | |
| Comparative Example 2 | 2 | |
| | (full coverage from here) | |
| Comparative Example 3 | 2 | |
| LAYER THICKNESS 16-20 µm | VALUE | |
| Example 1 | 1 | |
| Comparative Example 4 | 1-2 | |
| Comparative Example 2 | 1-2 | |
| Comparative Example 3 | 2 | |

Cloud formation preferentially occurs at small layer thicknesses. The decisive factor is that its occurrence is acceptable at a layer thickness affording full coverage. This layer thickness should be as low as possible. This corresponds to the current trend in the automobile industry for fully covering layers having increasingly lower layer thicknesses.

Besides Comparative Example 4, Comparative Example 1 shows the best results in this respect. However, the example according to the invention is somewhat better, as it covers fully at layer thicknesses as low as 10 to 12 µm and shows tolerable cloud formation, but while Comparative Example 4 also affords full coverage at this layer thickness, it shows tolerable cloud formation only at 12 to 14 µm. Thin pigments show the best orientation in the lacquer layer. Their covering power is likewise considerably better. Both effects cause a lower tendency to cloud formation at low lacquer thicknesses.

In addition to this comparison, cloud formation was also investigated in lacquers which have the same pigmentation level.

An even better result is seen for Example 1, as a fully covering lacquer film is achieved even earlier.

Chemical Resistance in Single-Layer Lacquers:

The test for chemical resistance was carried out as follows:

In an examination of the resistance to various acids and alkalis, sheet metals which were coated with single-layer lacquers in the lacquer systems 2 and 3 of the various examples according to the invention or comparative examples, as described below, were sprinkled with hydrochloric acid and sulfuric acid of various concentrations and also with sodium hydroxide solution. The drops were allowed to act on the respective sheet metal for 5 minutes to three hours. After washing off the acids or alkalis, each drop area was assessed visually for the degree of graying according to the following grading:

0 points=no attack
1 point=slight graying
2 points=distinct graying
3 points=complete graying From altogether 14 drop areas, a complete evaluation was calculated using 0-42 points. The scores were in turn graded as follows:

| | |
|---|---|
| 0-4 points: | grade 1 (very good) |
| 5-9 points: | grade 2 (good) |
| 10-18 points: | grade 3 (average) |
| 19-28 points: | grade 4 (poor) |
| 29-42 points: | grade 5 (very poor) |

TABLE 5

Chemical resistance in single-layer lacquers:

| Sample | Score | Grade | Lacquer system |
|---|---|---|---|
| Example 5 | 2 | 1 | 2 |
| Comparative Example 6 | 9 | 2 | 2 |
| Comparative Example 7 | 14 | 3 | 2 |
| Comparative Example 8 | 0 | 1 | 2 |
| Example 9 | 0 | 1 | 3 |
| Comparative Example 10 | 6 | 2 | 3 |
| Comparative Example 11 | 1 | 1 | 3 |
| Comparative Example 12 | 3 | 1 | 3 |
| Uncoated Metallux 2156 in lacquer system 3 | 14 | 3 | 3 |

The results show that coating compositions containing chromated aluminum pigments (Hydrolux 2156) do not pass the chemical test in lacquer system 2. The coating compositions containing $SiO_2$-coated conventional silver dollar pigments (Hydrolan 2156) perform better as a whole, but do not pass the test in lacquer system 3. Coating compositions which contain the pigments according to the present invention or the PVD pigments pass the test in both cases. In the overall evaluation, however, the chemical resistance of the coating compositions according to the invention performs best, closely followed by those which were pigmented with PVD pigments. PVD pigments perform best in lacquer system 2 conceived for their use. The thin aluminum pigments produced by gentle shaping in the process according to the invention, however, can be employed far more universally, so that the coating compositions according to the invention are subject to fewer variations in their property profile than coating compositions which contain PVD pigments.

Results of the Individual Lacquer Systems Relative to Each Another:

Compared with the known silver dollar pigments, the examples according to the invention have a markedly improved covering power, improved brightness and flop properties.

With respect to light-dark shading, the novel coating compositions show a hitherto unknown low tendency to cloud formation on account of the aforementioned properties.

Owing to the good embedding in the lacquer system, an appreciable chemical resistance of the coating produced using the coating agent according to the invention results even in single-layer lacquer systems.

The present invention accordingly provides aqueous coating compositions which contain aluminum pigments provided with an anti-corrosion layer, the aluminum pigments together with the anti-corrosion layer having a mean layer thickness of less than 160 nm. Coating compositions of this type make it possible to produce a high-gloss metallic coating film without cloud formation and with the visual impression of a structureless cohesive metal film, which is reminiscent of "liquid metal". In addition, these coating compositions are highly economical with respect to the aluminum pigments on account of their high covering power. These effects are also present at small layer thicknesses as have been unattainable hitherto. Moreover, the coatings show high chemical resistance in single-layer lacquers with or without protection by an additional clear layer of lacquer.

The invention claimed is:

1. An aqueous coating composition, comprising at least one water-compatible film-forming agent and aluminum pigments that are provided with at least one inorganic anti-corrosion layer, characterized in that the aluminum pigments, which are rolled out by mechanical shaping, have a lamellar structure and the thickness of said aluminum pigments, plus that of the at least one inorganic anti-corrosion layer, averages less than 160 nm;

said anti-corrosion layer consists essentially of silicon dioxide, wherein a silicon dioxide surface of said layer is coated with silanes; and an aspect ratio, which is calculated from the ratio of an average longitudinal extent to an average thickness of said aluminum pigments provided with the at least one inorganic anti-corrosion layer is more than 200.

2. An aqueous coating composition according to claim 1, characterized in that the thickness of said aluminum pigments provided with at least one inorganic anti-corrosion layer averages less than 120 nm.

3. A coating composition according to claim 1, characterized in that the weight of the anti-corrosion layer is less than 20% by weight, based on the total weight of the aluminum pigments that are provided with said anti-corrosion layer.

4. A coating composition according to claim 1, characterized in that said film-forming agent is selected from the group consisting of polyurethanes, polyamides, polyureas, melamineformaldehyde resins, polyimides, polyacrylates, polymethacrylates, epoxy resins, polyethers, polyesters, and mixtures thereof.

5. A coating composition according to claim 1, characterized in that
said film-forming agent contains carboxyl groups and has an acid value of from 10 to 100 mg KOH/g of binding agent and also has molecular weights ranging from 500 to 5000 g/mol.

6. A coating composition according to claim 5, wherein said film-forming agent has an acid value of from 40 to 80 mg KOH/g of binding agent.

7. A coating composition according to claim 1, characterized in that
the coating composition contains not more than 10% by weight of aluminum pigments that are provided with the at least one anti-corrosion layer, based on the total weight of the coating composition.

8. A coating composition according to claim 1, characterized in that
the ratio by weight of aluminum pigments that are provided with the at least one anti-corrosion layer to the film-forming agent(s) in the coating composition is from 1:1 to 1:10.

9. A coating composition according to claim 1, characterized in that
the ratio by weight of aluminum pigments that are provided with the anti-corrosion layer to the film-forming agent(s) in the coating composition is from 1:3 to 1:6.

10. A coating composition according to claim 1, characterized in that
the solids content of the coating composition ranges from 8 to 40% by weight.

11. A coating composition according to claim 1, characterized in that
said coating composition produces, following application and drying on a substrate, a high-gloss, structureless, metallic-looking coating.

12. A coating composition according to claim 1, characterized in that
the thickness of said aluminum pigments provided with at least one inorganic anti-corrosion layer averages less than 140 nm.

13. A coating composition according to claim 1, characterized in that
the coating composition contains of at least one of additional inorganic and organic colored pigments and dyes.

14. A coating composition according to claim 1, characterized in that
the coating composition contains additional effect pigments.

15. A coating composition according to claim 1, characterized in that
said coating composition contains further additives selected from the group consisting of, fillers, reactive diluents, UV absorbers, light-stabilizing agents, free-radical scavengers, photoinitiators and coinitiators, crosslinking agents, de-aerating agents, slip additives, inhibitors, defoaming agents, emulsifiers, wetting and dispersing agents, adhesion promoters, leveling agents, film-forming aids, thickeners, flameproofing agents, liquid driers, drying agents, antiskinning agents, corrosion inhibitors, anti-corrosive pigments, waxes, and combinations of said additives.

16. A coating composition according to claim 15, characterized in that said anti-corrosive pigments are selected from the group consisting of strontium zinc phosphosilicate, zinc aluminum polyphosphate hydrate, zinc calcium aluminum strontium phosphate silicate hydrate, zinc calcium strontium orthophosphate silicate, strontium aluminum polyphosphate hydrate, calcium aluminum polyphosphate silicate hydrate, sodium molybdate, calcium molybdate, zinc molybdate, sodium phosphomolybdate, calcium phosphomolybdate, zinc phosphomolybdate, zinc phosphate complex, and mixtures thereof.

17. A coated object, characterized in that
the object is coated with a coating composition according to claim 1.

18. A coating composition according to claim 1, wherein said anti-corrosion layer additionally contains at least one molybdenum peroxide.

* * * * *

UNITED STATES PATENT AND TRADEMARK OFFICE
CERTIFICATE OF CORRECTION

PATENT NO.        : 8,709,145 B2
APPLICATION NO.   : 11/628431
DATED             : April 29, 2014
INVENTOR(S)       : Maul et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1128 days.

Signed and Sealed this
Twenty-ninth Day of September, 2015

Michelle K. Lee
*Director of the United States Patent and Trademark Office*